US007162423B2

(12) United States Patent
Thrasher et al.

(10) Patent No.: US 7,162,423 B2
(45) Date of Patent: Jan. 9, 2007

(54) METHOD AND APPARATUS FOR GENERATING AND DISPLAYING N-BEST ALTERNATIVES IN A SPEECH RECOGNITION SYSTEM

(75) Inventors: Chris Thrasher, Kirkland, WA (US); Fileno A. Alleva, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 137 days.

(21) Appl. No.: 10/996,317

(22) Filed: Nov. 23, 2004

(65) Prior Publication Data

US 2005/0091054 A1    Apr. 28, 2005

Related U.S. Application Data

(62) Division of application No. 09/804,117, filed on Mar. 12, 2001, now Pat. No. 6,856,956.

(60) Provisional application No. 60/219,861, filed on Jul. 20, 2000.

(51) Int. Cl.
*G10L 15/10* (2006.01)

(52) U.S. Cl. .................................................. 704/251

(58) Field of Classification Search ............... None
See application file for complete search history.

(56) References Cited

U.S. PATENT DOCUMENTS

| | | | |
|---|---|---|---|
| 4,802,231 A | 1/1989 | Davis | 382/34 |
| 5,241,619 A | 8/1993 | Schwartz et al. | 395/2 |
| 5,509,104 A | 4/1996 | Lee et al. | 395/2.65 |
| 5,566,272 A | 10/1996 | Brems et al. | 395/2.4 |
| 5,625,748 A | 4/1997 | McDonough et al. | 395/2.6 |
| 5,649,057 A | 7/1997 | Lee et al. | 395/2.65 |
| 5,677,990 A | 10/1997 | Junqua | 395/2.64 |
| 5,710,864 A | 1/1998 | Juang et al. | 395/2.47 |
| 5,710,866 A | 1/1998 | Alleva et al. | 395/2.65 |
| 5,712,957 A | 1/1998 | Waibel et al. | 395/2.49 |
| 5,797,123 A | 8/1998 | Chou et al. | 704/256 |
| 5,805,772 A | 9/1998 | Chou et al. | 395/2.64 |
| 5,983,177 A | 11/1999 | Wu et al. | 704/244 |
| 6,029,124 A | 2/2000 | Gillick et al. | 704/200 |
| 6,856,956 B1 * | 2/2005 | Thrasher et al. | 704/251 |

OTHER PUBLICATIONS

Word-Based Acoustic Confidence Measures for Large-Vocabulary Speech Recognition. Asela Gunawardana et al., Microsoft Corporation, Redmond, WA.
Continuous Hidden Markov Modeling for Speaker-Independent Word Spotting. J. Robin Rohlicek et al., BBN System and Technologies Corporation, Cambridge, MA 1989 IEEE.
A Hidden Markov Model Based Keyword Recognition System. Richard C. Rose et al. Lincoln Laboratory, MIT 1990 IEEE.
Confidence Measures and Their Application to Automatic Speech Recognition. Fil Alleva et al., Microsoft Corporation, Redmond, WA.

(Continued)

*Primary Examiner*—Susan McFadden
(74) *Attorney, Agent, or Firm*—Joseph R. Kelly; Westman, Champlin, & Kelly, P.A.

(57) ABSTRACT

The present invention is directed to a generating alternatives to words indicative of recognized speech. A reference path of recognized words is generated, based upon input speech data. An operator selection input is received and is indicative of a selected portion of the recognized speech, for which alternatives are to be generated. Boundary conditions for alternatives to be generated are calculated based upon bounds of a reference subpath corresponding to the selected portion of the recognized speech. Alternate subpaths satisfying the boundary conditions are constructed from a hypothesis store which corresponds to the input speech data.

25 Claims, 8 Drawing Sheets

OTHER PUBLICATIONS

Confidence Measures for the Switchboard Database. Stephen Cox et al. Speech Research Department, AT & T Bell Labs, NJ 1996 IEEE.

Large Vocabulary Word Scoring as a Basis for Transcription Generation. P. Jeanreanaud et al. BBN Systems and Technologies, Cambridge, MA.

LVCSR Log-Likelihood Ratio Scoring for Keyword Spotting. Michel Weintraub. SRI International Speech Technology and Research Program. Menlo Park, CA 1995 IEEE.

Word-Based Confidence Measures as a Guide for Stack Spearch in Speech Recognition. Chalapathy V. Neti et al., IBM T.J. Watson Research Center, Yorktown Heights, NY 1997 IEEE.

Whistler: A Trainable Text-to-Speech System. ICSLP 96 Microsoft Corporation, Redmond, WA.

Microsoft Windows Highly Intelligent Speech Recognition Whisper. Xuedong Huang et al., Microsoft Corporation. Redmond, WA 1995 IEEE.

* cited by examiner

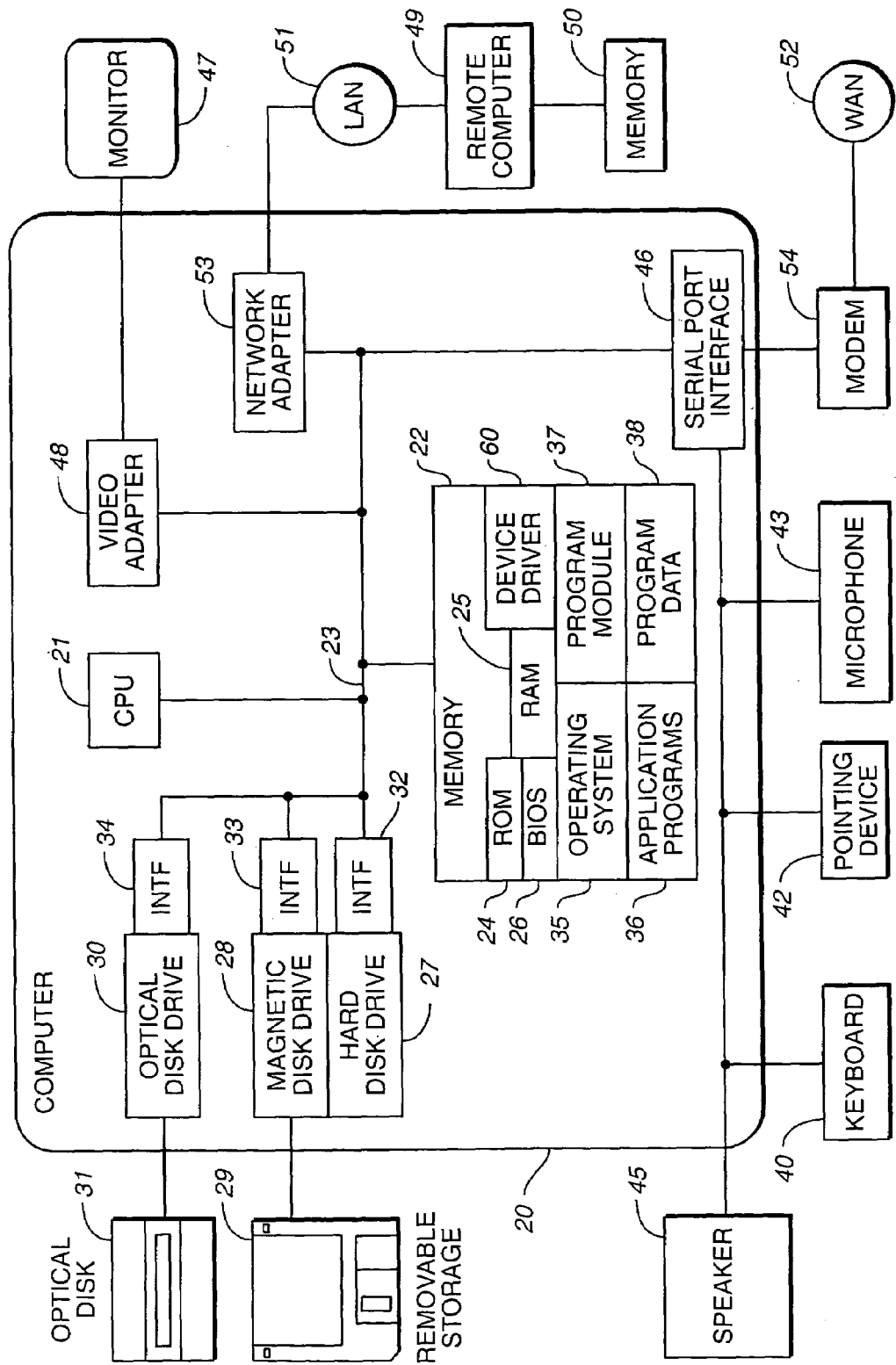
FIG._1

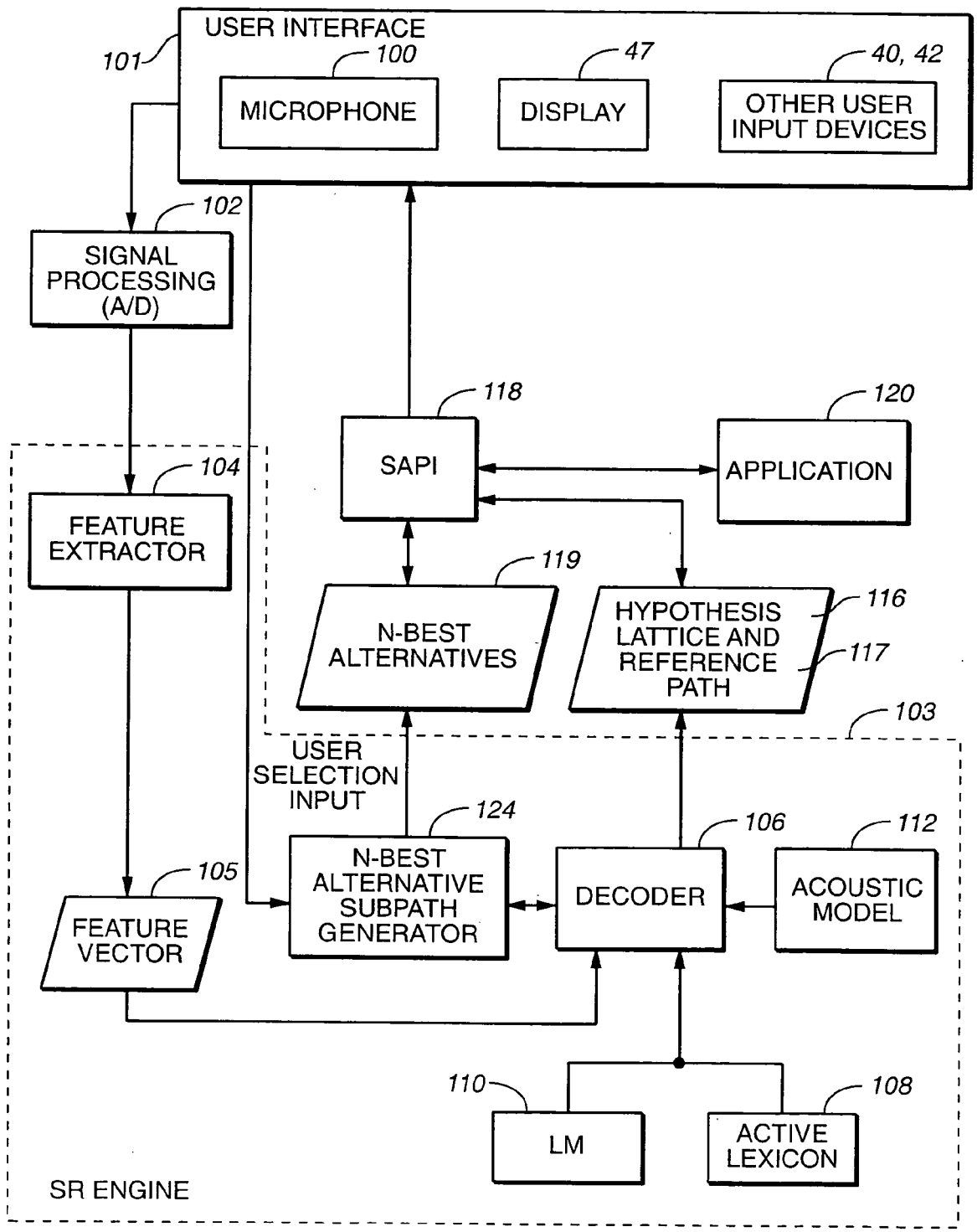
FIG._2

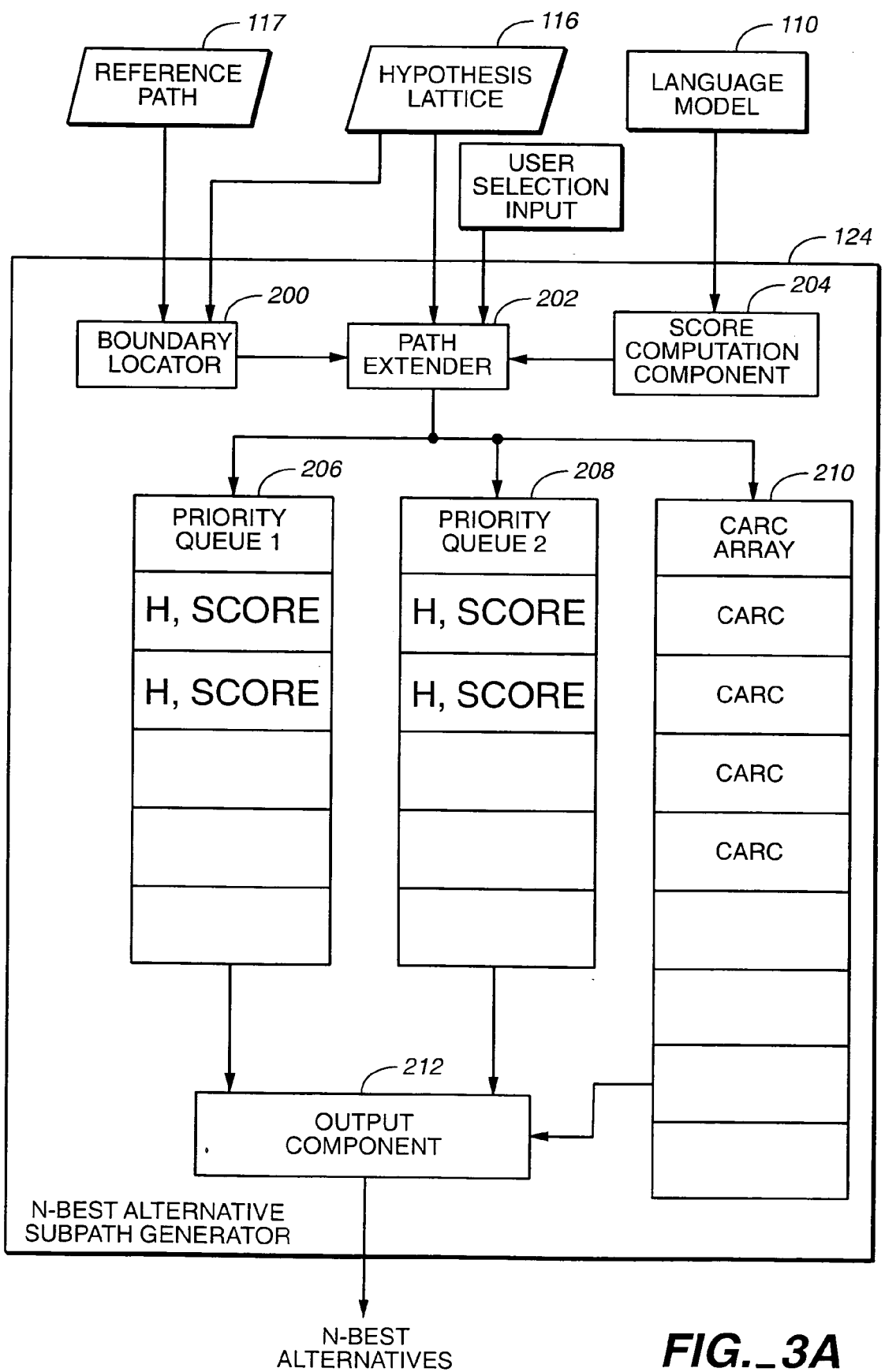
FIG._3A

| CARC OBJECT DATA STRUCTURE |
|---|
| INDEX OF THIS OBJ IN CARC ARRAY |
| WORD HYPOTHESIS INDEX |
| PATH LENGTH |
| INDEX OF PREV. CARC OBJ |
| DICTIONARY WORD INDEX OF PRECED. WORD |
| DICTIONARY WORD INDEX OF WORD PRECEDING THE PRECEDING WORD |
*FIG._3B*
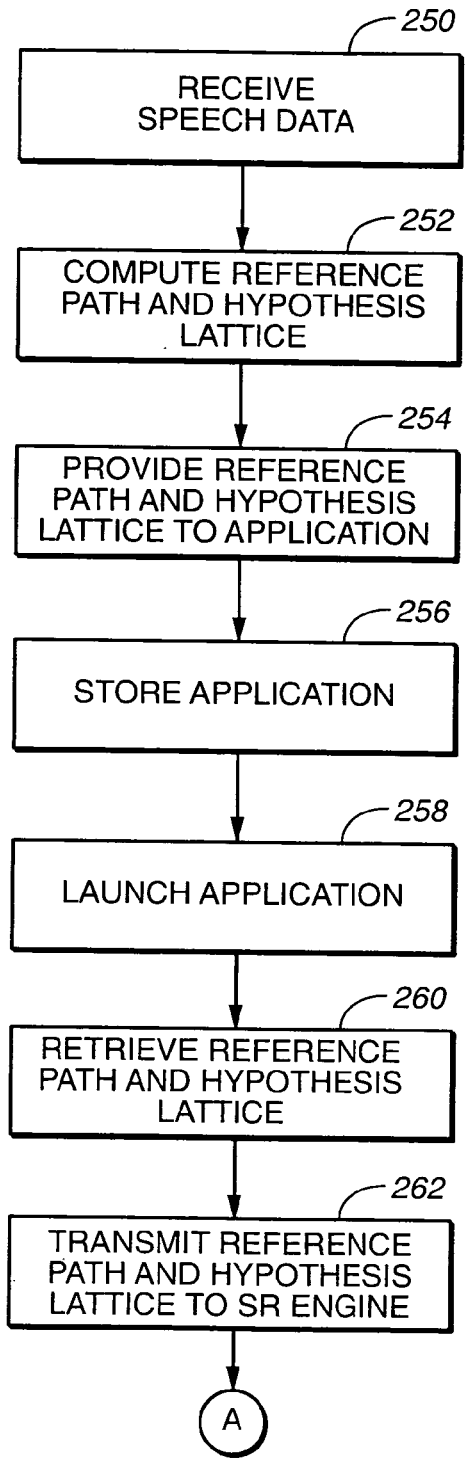
*FIG._4A*

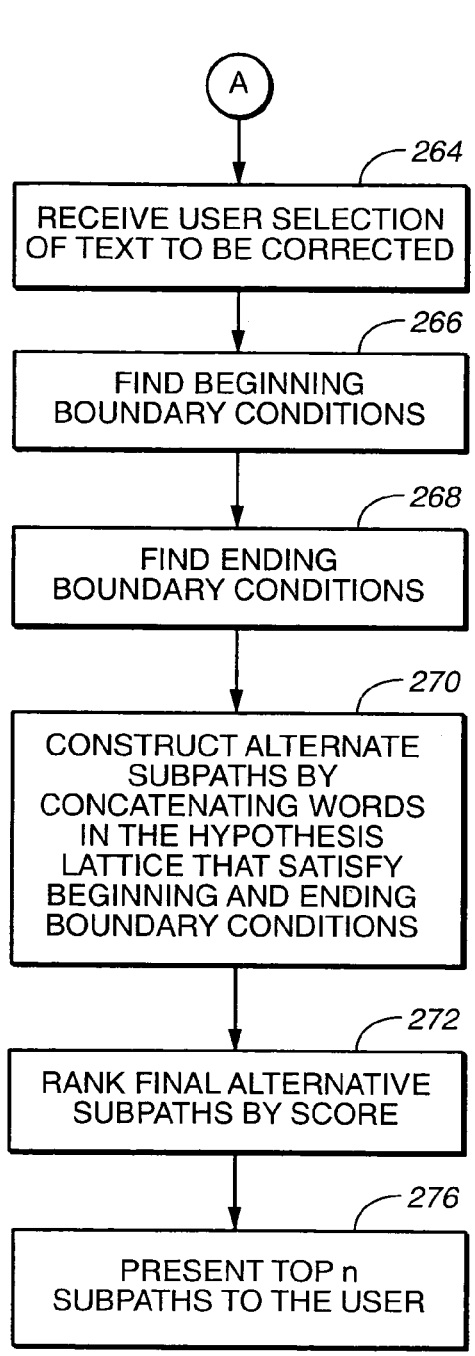
FIG._4B
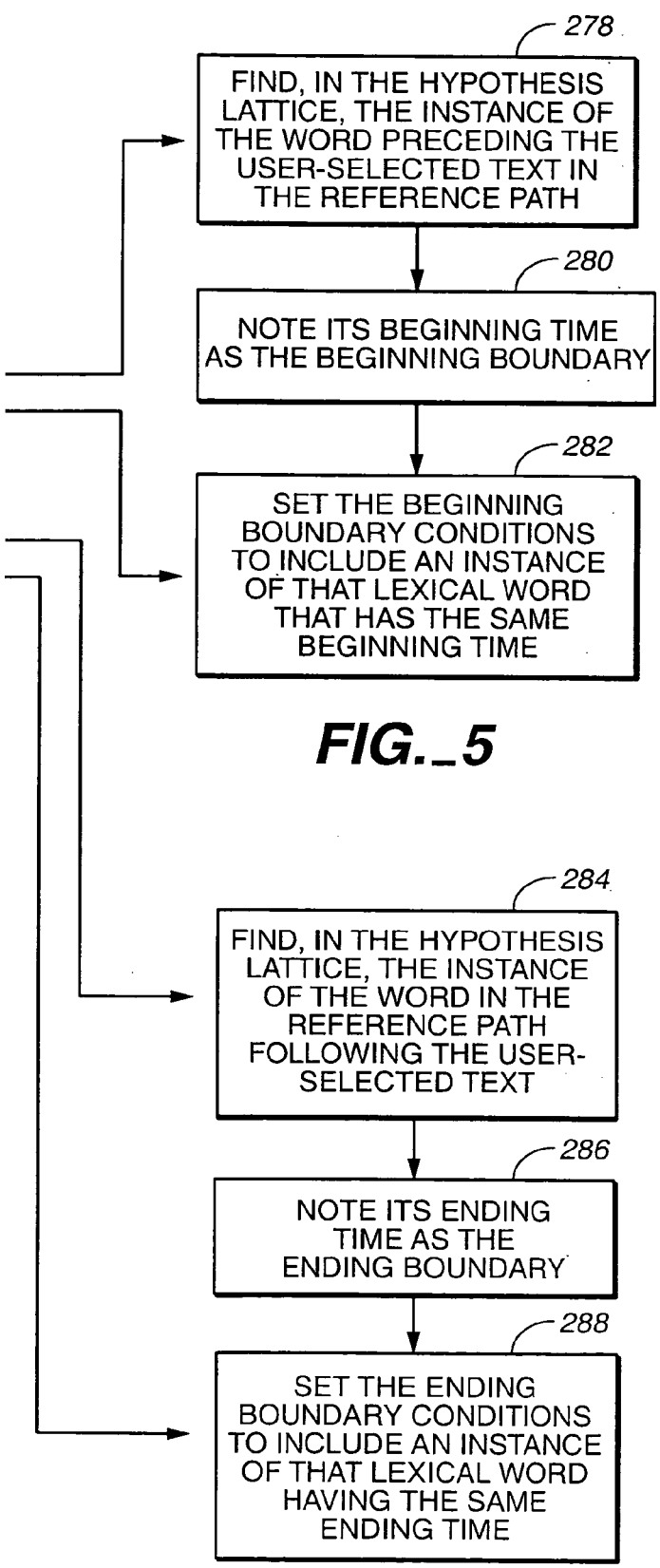
FIG._5
FIG._6

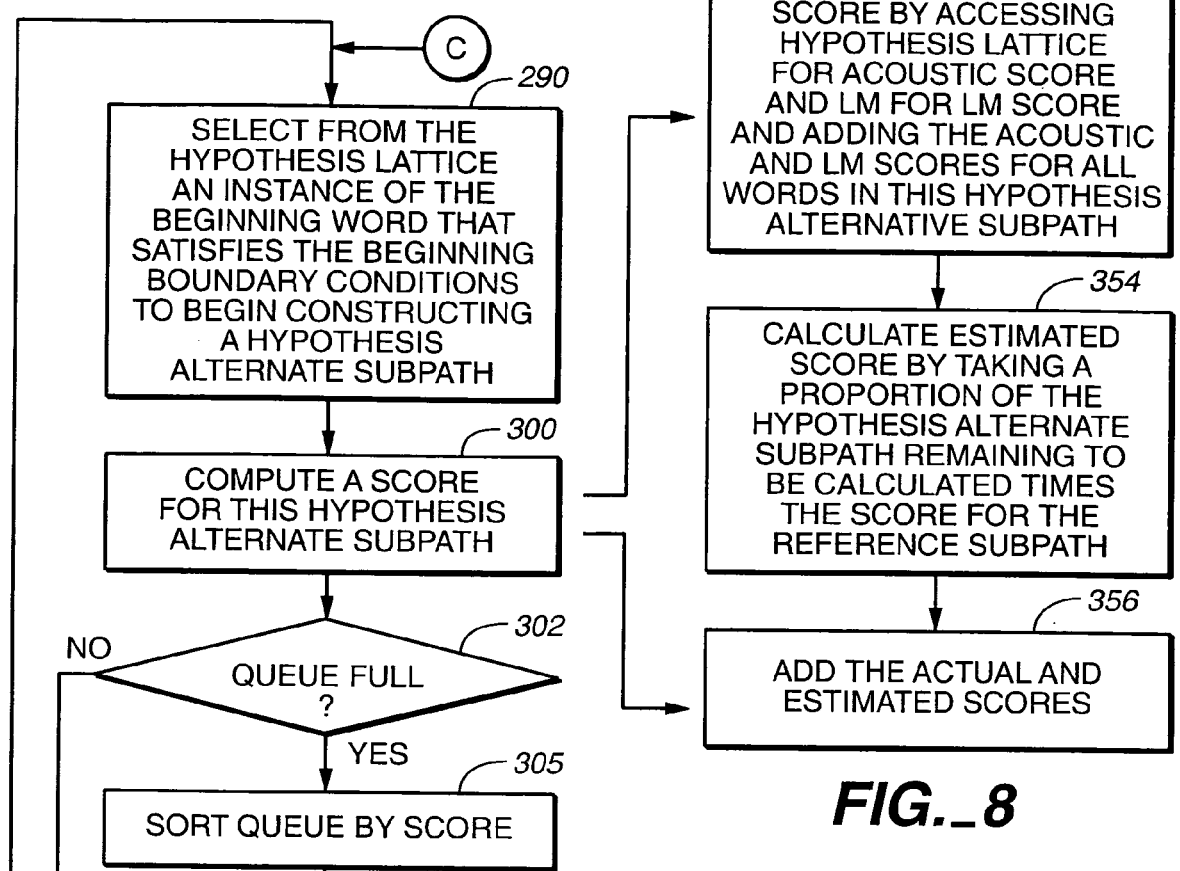
FIG._7A
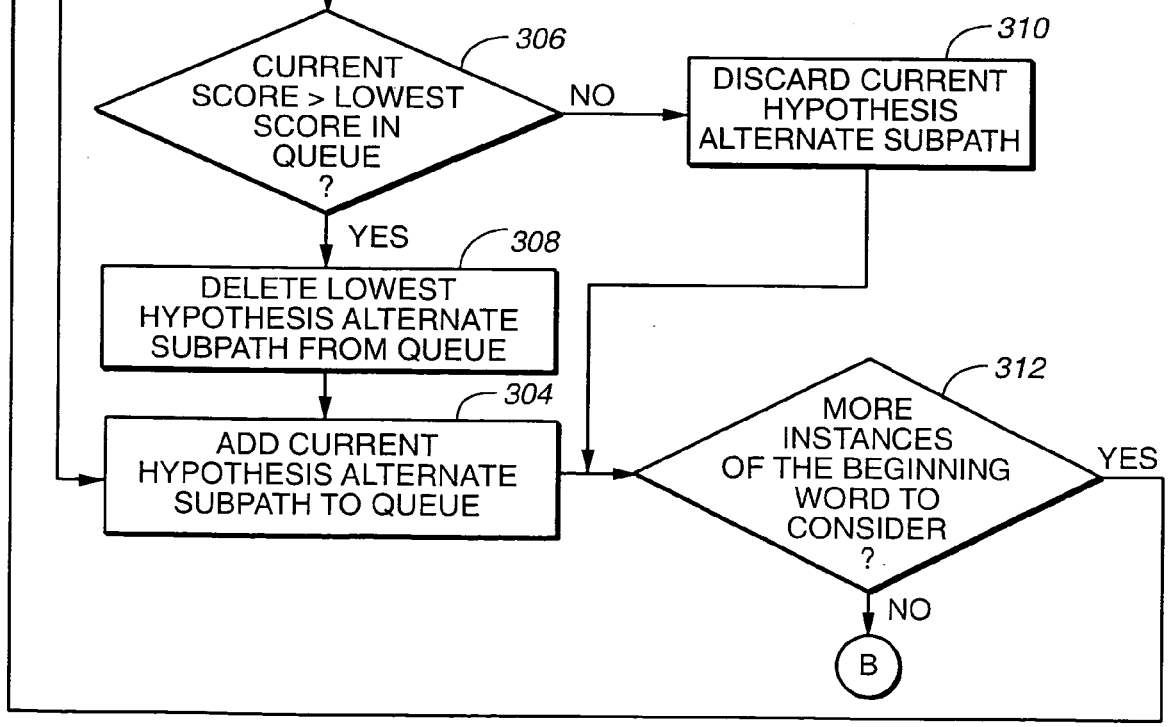
FIG._8

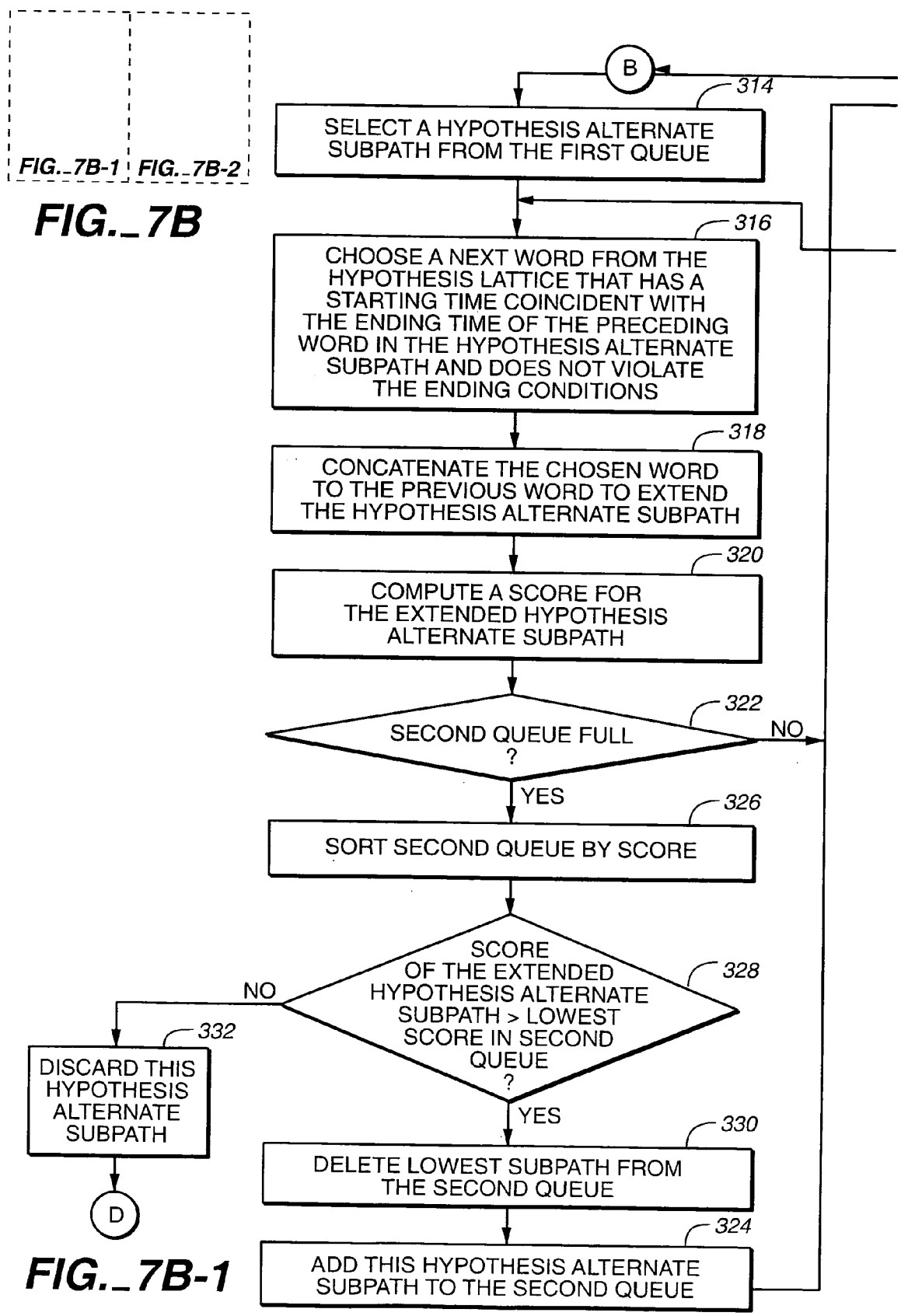

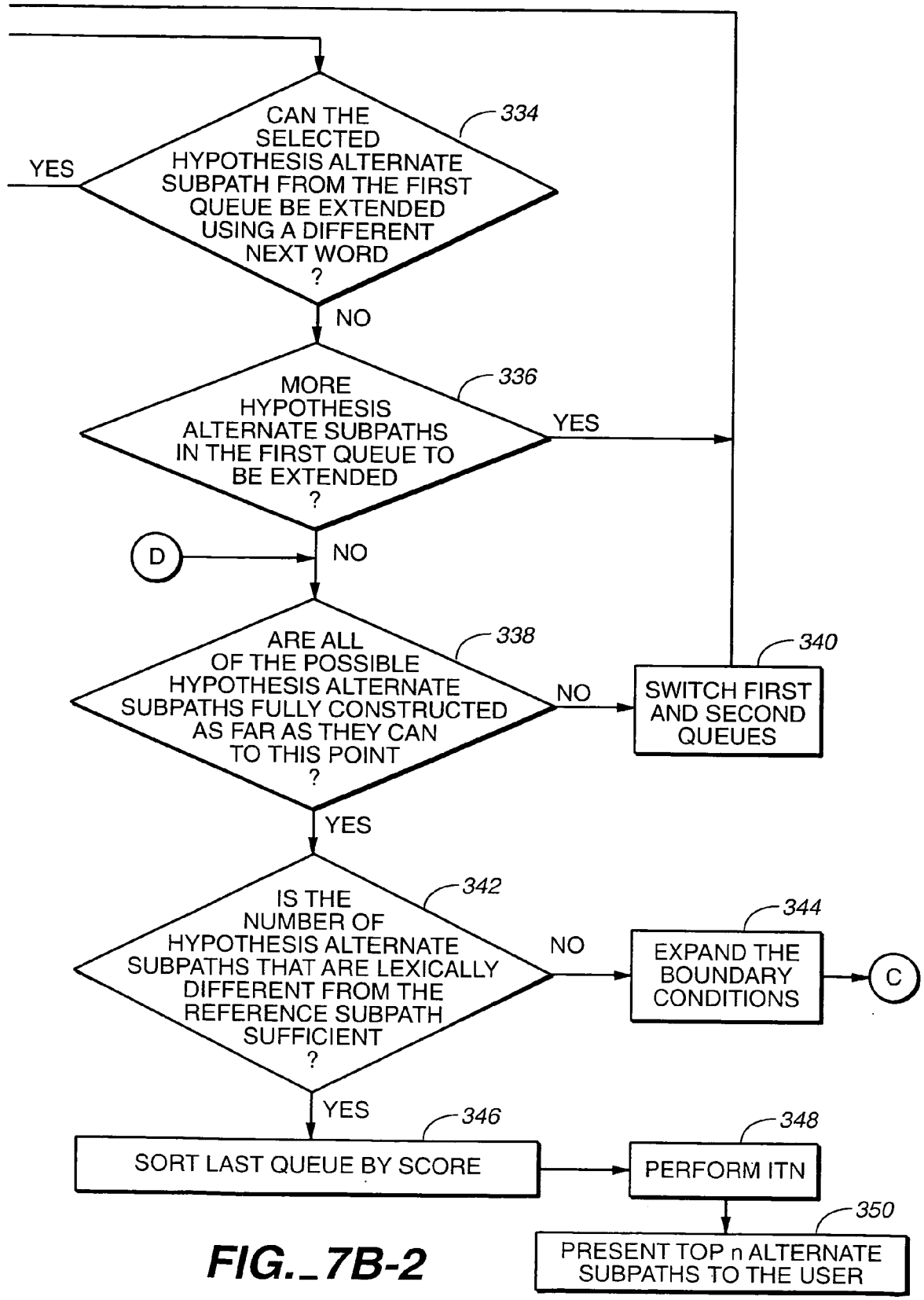
FIG.__7B-2

METHOD AND APPARATUS FOR GENERATING AND DISPLAYING N-BEST ALTERNATIVES IN A SPEECH RECOGNITION SYSTEM

The present application is a divisional of and claims priority of U.S. patent application Ser. No. 09/804,117, filed Mar. 12, 2001, now U.S. Pat. No. 6,856,956 which based on and claims the benefit of U.S. provisional patent application Ser. No. 60/219,861, filed Jul. 20, 2000, the content of which is hereby incorporated by reference in its entirety.

BACKGROUND OF THE INVENTION

The present invention deals with speech recognition engines. More specifically, the present invention deals with providing a user with alternatives to the speech recognition output provided by the engine.

Speech recognition engines receive speech data indicative of words spoken by a user. The speech data is provided to a decoder for recognition. The decoder accesses a plurality of models, such as acoustic models and language models, and identifies a word, or a sequence of words, from the speech data input to the engine.

However, even the most advanced real-time continuous speech recognition engines currently available can not correctly determine 100% of what a speaker has uttered. Therefore, it is not uncommon for a user to wish to change or correct a recognition result provided by an engine. Instead of forcing the speaker to re-utter the mis-recognized phrase, it is often more efficient to provide the speaker with additional possible interpretations of the utterance, since there is a reasonable chance that what the user actually said was one of the alternate interpretations provided by the decoder.

In the past, when the user highlighted recognized text to be corrected (or otherwise indicated a portion of the recognized text which needed to be changed), the engine provided a number of alternate suggestions to the user. However, these alternate suggestions were not always the best suggestions, based upon scores generated by the speech recognition engine. Instead, the alternatives provided were often simply a fixed, predetermined number, of alternatives that the engine was required to provide to the application. Such alternatives did not utilize information that the engine held regarding the acoustic confidence and probabilities of word combinations.

Similarly, in prior engines, if a document was dictated, for example, by the user, and was saved for later editing, it was very cumbersome for all of the alternatives to be maintained such that they could be displayed to the user at a later time. Further, in order to present the best alternatives to the user, it is necessary for scores to be computed which correspond to the alternatives. Therefore, it would have been very cumbersome with prior systems to attempt to calculate scores for all possible alternatives, such that those alternatives and scores could be saved, and so that the user could retrieve them during a later editing process. In fact, the complexity of this problem, as measured by the number of potential candidates for the N-Best alternatives, increases exponentially as the duration of time for which alternates are computed increases.

SUMMARY OF THE INVENTION

The present invention is directed to a method and apparatus for generating alternatives to words indicative of recognized speech. A reference path of recognized words is generated, based upon input speech data. An operator selection input is received and is indicative of a selected portion of the recognized speech, for which alternatives are to be generated. Boundary conditions for alternatives to be generated are calculated based upon bounds of a reference subpath corresponding to the selected portion of the recognized speech. Alternate subpaths satisfying the boundary conditions are constructed from a hypothesis store which corresponds to the input speech data.

In one embodiment, the boundary conditions are calculated by identifying beginning and ending boundary conditions which correspond, respectively, to a beginning time in the reference path of a first boundary word that precedes the selected portion of the recognized speech and an ending time in the reference path of a second boundary word that follows the selected portion of the recognized speech. Also, in one embodiment, the hypothesis store is a lattice indicative of entries for a plurality of alternate words corresponding to utterances in the input speech data. Each entry illustratively includes a lexical word, a beginning time in the input speech data corresponding to the lexical word and an ending time in the speech data corresponding to the lexical word. The alternate subpaths are constructed by first obtaining from the hypothesis lattice instances of the first boundary word that satisfy the beginning boundary condition. The alternative subpaths are further constructed by concatenating to each of the instances of the first boundary word a string of one or more additional words, wherein the string of additional words satisfy the ending boundary condition.

In accordance with one embodiment, up to a predetermined number X of hypothesis alternative subpaths are constructed. They are called "hypothesis" alternative subpaths because it is not yet known whether they will indeed be the alternate subpaths actually maintained. Each of those subpaths is assigned a score which is updated as the hypothesis alternative subpath is constructed. Only the hypothesis alternate subpaths having the top X scores are maintained. In one embodiment, the subpaths are represented by entries in priority queues which are sorted based on score such that only a portion of the subpaths contained in the priority queues are presented to the user. As the subpaths are constructed, their scores are continuously updated and sorted such that the engine is never considering more than a predetermined maximum number of subpaths.

In accordance with another embodiment, the hypothesis lattice is stored along with the application for which the speech recognition is being performed. Then, when a user later provides a user selection input indicative of a portion of the reference speech path to be corrected, the hypothesis lattice is retrieved and the engine constructs alternative subpaths to replace portions of the referenced speech path based on the entries in the hypothesis lattice.

BRIEF DESCRIPTION OF THE DRAWINGS

FIG. 1 is a block diagram of one embodiment of a general environment for implementing the speech recognition system in accordance with one aspect of the present invention.

FIG. 2 is a block diagram of the speech recognition system in accordance with one illustrative embodiment of the present invention.

FIG. 3A is a more detailed block diagram of a portion of a speech recognition engine of the present invention.

FIG. 3B illustrates a data structure in accordance with one embodiment of the present invention.

FIGS. 4A and 4B are flow diagrams illustrating the operation of the speech recognition system.

FIGS. 5 and 6 are flow diagrams illustrating the calculation of boundary conditions in accordance with one embodiment of the present invention.

FIGS. 7A and 7B are flow diagrams illustrating operation of the speech recognition system.

FIG. 8 is a flow diagram illustrating one embodiment of score calculation for alternatives.

DETAILED DESCRIPTION OF THE ILLUSTRATIVE EMBODIMENTS

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example, in small vocabulary implementations.

FIG. 2 provides a more detailed block diagram of modules of the general environment of FIG. 1 that are particularly relevant to the present invention. In FIG. 2, an input analog speech signal is converted into an electrical signal, by a microphone 100. The electrical signal is then converted into a series of digital values by an analog-to-digital (A-to-D) converter 102. In one embodiment, A-to-D converter 102 samples the analog signal at 16 kHz with a 16 bit resolution thereby creating 16,000 samples of speech data per second, or 32 kilobytes of speech data per sound.

The digital data is provided to a feature extractor 104 in speech recognition (SR) engine 103. Feature extractor 104 extracts a feature 105 from the digital signal. Some examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module 104 receives the stream of digital values and produces a stream of feature vectors 105 that are each associated with a frame of the input signal. In many speech embodiments, the frames are 20 milliseconds in length and the centers of the frames are separated by 10 milliseconds, although this is mentioned for exemplary purposes only.

The stream of feature vectors 105 produced by the extraction module 104 is provided to a decoder 106, which accesses lexicon 108, language model 110, and acoustic model 112 and identifies a most likely sequence of patterns based on the stream of feature vectors.

In one illustrative embodiment, acoustic model 112 is based on a Hidden Markov Model consisting of a set of states, with each frame of the input matched to one frame of the input signal. Each state has an associated set of probability distributions that describe the likelihood of an input feature vector matching a particular state. The model also includes probabilities for transitioning between two neighboring model states as well as allowed transitions between states for particular pattern units. The size of the pattern units can be different for different embodiments of the present invention. For example, for speech recognition embodiments where the pattern units are linguistic units, the pattern units may be senones, phonemes, diphones, triphones, syllables, or even whole words.

Lexicon 108 illustratively consists of a list of words or labels that identify the patterns to be recognized. Such a lexicon may comprise linguistic words or syllables.

Language model 110 provides a set of likelihoods that a particular pattern or sequence of patterns will appear in the environment of interest. For example, language model 110 provides a set of likelihoods that a particular word or sequence of words will appear in a particular language. In one illustrative speech embodiment, the language model is based on a text database such as the North American Business News (NAB), which is described in greater detail in a publication entitled CSR-III Text Language Model, University of Penn., 1994. The language model may be a context-free grammar or a statistical n-gram model such as a trigram. In one embodiment, the language model is a compact trigram model that determines the probability of a sequence of patterns based on the combined probabilities of three-pattern segments of the sequence. For example, the trigram model is based on the combined probabilities of three-word segments.

The language model 110 may also provide a statistical probability of any sequence of letters. In one illustrative embodiment, a letter trigram language model is used which provides the probability of any three-letter sequence. However, any other letter language model which provides a statistical estimate of the letter probability can be used, or such a model can be omitted.

In performing speech recognition, based on the acoustic model, the language models, and the lexicon, decoder 106 identifies a most likely sequence of patterns from all possible pattern sequences. The most likely sequence of patterns or words is referred to herein as the reference paths. Decoder 106 also identifies a plurality of hypothesis patterns that are less likely sequences, but may also be the correct recognized speech.

The reference path and the other most probable sequences of patterns (the other hypotheses) can be provided as a result lattice 116 to an optional confidence measure module. The confidence measure module identifies which patterns are most likely to have been improperly identified by the recognizer. The confidence measure module then provides, at its output, the sequences of hypothesis patterns along with identifiers indicating which patterns may have been improperly identified. Those skilled in the art will recognize that such a confidence measure module is not necessary for the practice of the present invention.

In any case, a reference path and a result lattice (or hypothesis lattice) 116 are eventually provided to speech application programming interfaces (SAPI) 118 which provides the result lattice in a desired format, to application program 120. The result lattice illustratively includes entries which have a lexical word, a beginning time and ending time in the recognized speech for that lexical word and the acoustic score for that lexical word. An example of such a lattice is discussed in greater detail below. In one illustrative embodiment, application program 120 is a word processing or dictation program for generating a document.

User interface 101 includes an optional display 47 (such as a monitor) to display the words as they are spoken. User interface 101 also includes other user input devices which can be used to provide signals to the remainder of the speech recognition system, either directly, or through SAPI 118. As will be discussed below, such input signals configure the speech recognition system to generate alternatives to selected portions of the reference path.

FIG. 2 also shows that SR engine 103 includes N-Best alternative subpath generator 124 (generator 124) which is used to generate the alternatives. It will occasionally happen that the reference path (recognized speech) output to the user through user interface 101 or to application 120 will be incorrect. In that case, the user, using a mouse or other point and click device, a keyboard, voice command, etc. can provide a user input signal to generator 124. The user input is indicative of a portion of the reference path that the user has identified as being incorrect. Generator 124 accesses the reference path 117, hypothesis lattice 116 and language model 110. Based on these inputs, as well as the user indication of the text to be corrected, generator 124 generates the top N-Best alternatives to the word or phrase selected by the user.

By N-Best, it is meant an integer number N of the best alternatives to the selected text, as indicated by an N-Best score computed for the various alternatives represented in hypothesis lattice 117. Generator 124 provides the N-Best alternatives 119 to the user, or application 120, through SAPI 118. The user then may select one of the N-Best alternatives 119, such as through a point and click device or other user input mechanism. It should be noted that the user may also choose to have the system enter another mode of operation, such as to allow the user to re-utter the phrase.

In addition, it should be noted that the reference path 117, along with the hypothesis lattice 116, can be provided to application 120, and stored therewith for later editing. In that case, when the user wishes to edit the recognized speech, the user simply re-launches application 120. This causes application 120 to reinitialize the hypothesis lattice 116. The reference path is provided to the user and, when the user wishes to correct a portion of the reference path, the user selects or highlights a portion of the reference path as indicated above. In that instance, the hypothesis lattice 116 is provided back to the N-Best alternative subpath generator 124 either directly, or through the SAPI component 118 and decoder 106. N-Best alternative subpath generator 124 then simply generates the same N-Best alternatives in the same manner as indicated above. This process is described in greater detail below.

FIG. 3A is a more detailed illustration of a portion of generator 124. FIG. 3A shows that generator 124 illustratively includes boundary locator 200, path extender 202, score computation component 204, a first priority queue 206, a second priority queue 208, CARC array 210 and output component 212.

FIG. 3B illustrates, in greater detail a CARC object data structure stored in CARC array 210. This is discussed in greater detail below.

FIGS. 4A and 4B are a flow diagram which illustrate the operation of generator 124, along with decoder 106 and application 120, in greater detail. FIGS. 4A and 4B are discussed in conjunction with FIGS. 2 and 3A. Decoder 106 illustratively receives the feature vectors 105 from feature extractor 104. This is indicated by block 250 in FIG. 4A. Decoder 106 then computes the reference path 117 and hypothesis lattice 116, in a known manner. This is indicated by block 252. The reference path 117 and hypothesis lattice 116 are provided to application 120 which also, illustratively, provides it to the user through user interface 101. This is indicated by block 254. While the user may wish to correct the reference path (or the recognized speech) immediately, the user may wish to defer this until later. In that case, the user provides an indication to the operating system to store application 120, along with the hypothesis lattice and reference path provided to it. This is indicated by block 256.

When the user eventually wishes to correct the recognized speech provided by decoder 106, the user launches application 120. This is indicated by block 258. Of course, application 120 carries with it the recognized speech (including the reference path) and the hypothesis lattice 116. This is indicated by block 260 in FIG. 4A. The reference path (recognized speech) and hypothesis lattice 116 are again provided to SR engine 103 so the alternatives can be generated during correction of the recognized speech. This is indicated by block 262 in FIG. 4A.

It should be noted that storing and re-launching application 120 is purely optional. If the user wishes to edit the recognized speech immediately, the user certainly need not store application 120. FIG. 4A simply includes those steps to indicate that, in an illustrative embodiment, the hypothesis lattice is stored along with the application 120 such that it can be retrieved when the application is re-launched and the user wishes to edit the recognized speech.

In any case, once the user decides to edit the recognized speech, the user provides a user input to SR engine 103 indicative of user selected text to be corrected. As discussed with respect to FIG. 2, this user input can simply be formed by the user highlighting text or a phrase to be corrected using a point and click device, using voice commands, using a computer keyboard, or using any other suitable user input device which provides an indication of text or recognized speech to be corrected. This is indicated by block 264 in FIG. 4B.

FIG. 3A also shows that, in this instance, the user input and the hypothesis lattice are provided to path extender 202 in generator 124 while the reference path 117 is provided to boundary locator 200.

For purposes of illustration, assume that the user or speaker has uttered the phrase "one to three", but the SR engine 103 has mis-recognized this utterance as "one two three". In this case, a hypothesis lattice 116 may look like the following (bearing in mind that an actual hypothesis lattice would have far more word hypotheses, and this illustration has been simplified for purposes of illustration only):

TABLE 1

| # | Lexical Word | Start Time | End Time | Acoustic Score |
|---|---|---|---|---|
| 1 | One | 0 | 1000 | 100 |
| 2 | One | 0 | 1200 | 80 |
| 3 | Won | 0 | 1000 | 50 |
| 4 | To | 1000 | 2000 | 100 |
| 5 | Too | 1000 | 2000 | 50 |
| 6 | Two | 1000 | 2000 | 140 |
| 7 | Two | 1000 | 2000 | 80 |
| 8 | To | 1200 | 2000 | 140 |
| 9 | Three | 2000 | 3000 | 100 |
| 10 | Tree | 2000 | 3000 | 60 |

It can be seen that the hypothesis lattice includes, in the left most column a hypothesis indicator number, and following that, the lexical word which has been hypothesized along with a starting time that the word recognition began, an ending time that the word recognition ended, and an acoustic score from acoustic model 112 indicative of the acoustic score associated with that particular recognition result. For purposes of this example, assume that the original recognition (or reference path) output by engine 103 corresponds to the hypothesis path number 1-6-9 with a total acoustic score of 340. This sequence of word hypotheses will be referred to as the "best path" or "reference path".

The next best original recognition corresponds to the path represented by hypotheses 2-8-9, with a total acoustic score of 320. It should be noted that path 1-4-9 will also result in the word sequence "one to three" but has a lower acoustic score of 300.

The hypothesis lattice having been computed, along with the best path or reference path, the user is provided with the reference path as being indicative of recognized speech. Once the user receives a display of the reference path, the user will ask for alternates for the second word, since it was mis-recognized. This is received by path extender 202 in generator 124. In response, boundary locator 200 determines appropriate end points for an alternative path through the hypothesis lattice illustrated in Table 1. In doing so, boundary locator 200 first finds beginning boundary conditions as illustrated in block 266 in FIG. 4B and then finds ending boundary conditions as illustrated in block 268 in FIG. 4B.

The beginning and ending boundary conditions define words in the hypothesis lattice which can be used as alternates to the word or phrase selected by the user. Thus, these boundary conditions are effectively used to filter the hypothesis lattice for various combinations of words in the hypothesis lattice which can be presented to the user as the N-Best alternatives for the highlighted text.

Path extender 202 then utilizes score computation component 204, queues 206 and 208 and CARC array 210 to construct the alternate subpaths (as alternatives for the portion of the reference path highlighted by the user) by concatenating words in the hypothesis lattice 116 so that the entire concatenation satisfies the beginning and ending boundary conditions. This is indicated by block 270 in FIG. 4B and is described in greater detail in FIGS. 7A and 7B.

Once the alternative subpaths have been constructed, they are ranked by score. This is indicated by block 272 in FIG. 4B. The top-N subpaths are presented to the user. This is indicated by block 276. In performing this step, output component 212 obtains the top-N alternatives and provides them, for example, through SAPI component 118, to the user interface or application (or to the user interface through the application).

FIG. 5 is a more detailed flow diagram illustrating how boundary locator 200 identifies the beginning boundary conditions for its search through hypothesis lattice 116. It should first be noted that the user has indicated that the word corresponding to hypothesis number 6 in the lattice of Table 1 is incorrect. Therefore, that hypothesis will not be used in generating the N-Best alternatives. Further, since hypothesis 7 contains an instance of the same lexical word found in hypothesis path 6, hypothesis 7 will also be ignored in generating the N-Best alternatives, since it must be wrong as well.

That being the case, boundary locator 200 finds, in the hypothesis lattice the particular instance of the word preceding the user-selected text in the reference path. For example, since the reference path which was provided to the user included hypothesis 6 which was preceded by hypothesis 1, the lexical word "one" in hypothesis 1 is located in the hypothesis lattice. The beginning time (which happens to be start time 0) of that instance of the word in the hypothesis lattice is noted as the beginning boundary time. Locating the particular instance of the word preceding the highlighted text and its beginning time are indicated by blocks 278 and 280 in FIG. 5.

Since the user did not highlight (or select) the word "one" in the reference path that word must be correct. Therefore, boundary locator 200 identifies the boundary conditions such that the first word in the alternative phrase must start with the lexical word "one". Boundary locator 200 also sets as one of the beginning boundary conditions that any instance of the word "one" must have the same start time or beginning time as the particular instance of the word "one" which was provided in the reference path (e.g., starting time 0). Therefore, in the result lattice indicated in Table 1, both instances of the lexical word "one" (i.e., hypotheses 1 and 2) satisfy the beginning boundary conditions since they are both the lexical word "one" and since they both start at time 0. Setting the beginning boundary conditions is indicated by block 282 in FIG. 5.

FIG. 6 is a flow diagram illustrating in greater detail how boundary locator 200 finds the ending boundary conditions (illustrated by block 268 in FIG. 4B). Since the user only highlighted the word "two" and not the word "three" which follows it, the present invention assumes that the word "three" is correct. Therefore, boundary locator 200 first locates in the hypothesis lattice the specific instance of the word in the reference path which follows the user-selected text (in this case, the instance of the lexical word "three"). This corresponds to hypothesis number 9 in the hypothesis lattice of Table 1. This is indicated by block 284 in FIG. 6.

The ending time of this instance of the word following the highlighted text is noted as the ending boundary time. This is indicated by block 286. Since the ending time of hypothesis number 8 is 3000, one of the ending boundary conditions for all alternatives presented to the user requires that the alternative path end at the time 3000.

Boundary locator 200 then sets the ending boundary conditions to include that the last word in every alternative subpath must be the lexical word "three" and it must have an ending time of 3000. These constitute the ending boundary conditions. This is indicated by block 288 in FIG. 6.

FIGS. 7A and 7B are a flow diagram that illustrates how the alternative subpaths are constructed in greater detail. The beginning and ending boundary conditions now having been established, path extender 202 searches through hypothesis lattice 116 for possible concatenations of words which can be provided to the user as alternate subpaths. Therefore, path extender 202 selects from the hypothesis lattice an instance of the beginning word that satisfies the beginning boundary conditions (i.e., it is the same lexical word identified for the beginning boundary conditions and starts at the same beginning time) to begin constructing a hypothesis alternate subpath. The alternate subpaths are identified as "hypothesis alternate subpaths" because it is not known yet whether they will be one of those retained and provided to the user as one of the N-Best alternatives.

In any case, path expander 202 searches through hypotheses lattice 116 for words which satisfy the beginning boundary conditions. In doing this, path expander 202 will first come across hypothesis 1 in hypothesis lattice 116. Since this was the beginning of the reference path actually provided to the user, this will of course satisfy the boundary conditions. Selecting from the hypothesis lattice an instance of a beginning word that satisfies the beginning boundary conditions is indicated by block 290 in FIG. 7A.

A score is computed for this hypothesis alternate subpath as indicated by block 300. This score can be computed in any number of suitable ways, and one illustrative way is described later with respect to FIG. 8.

It is then determined whether queue 206 is full. This is indicated by block 302. If not, the current hypothesis (corresponding to hypothesis 1 from the hypothesis lattice, in this case) is simply added to queue 206, along with its score. This is indicated by block 304. However, if the queue is full of hypotheses, then the queue is sorted by score. This is indicated by block 304. If the score computed for the current hypothesis (computed at block 300) is greater than the lowest score in queue 206, as determined at block 306, then the lowest hypothesis in queue 206 is deleted from queue 206 as indicated by block 308, and the current hypothesis is added to queue 206. If, at block 306, it is determined that the current score is not greater than the lowest score in queue 206, then the current hypothesis is simply discarded, as illustrated by block 310.

CARC array 210 is an optional data structure used to construct and track extended hypothesis subpaths. Operation of CARC array 210 is discussed in greater detail below.

Path extender 202 then determines whether there are additional instances of the beginning word in the hypothesis lattice which must be considered. This is indicated by block 312. In the present example, there is an additional instance of the beginning word. For example, the second hypothesis in the hypothesis lattice of Table 1 also corresponds to the lexical word "one". The second hypothesis also has a starting time of 0 in the reference path. Therefore, the second hypothesis in the hypothesis lattice of Table 1 satisfies the beginning boundary conditions. This is determined at block 290, and a score is computed for the second hypothesis. Since there is currently only one entry in queue 206, the queue is not full so the second hypothesis, along with its score, is added to queue 206.

It is then determined whether there are even more instances of the beginning word in the hypothesis lattice which satisfy the beginning boundary conditions and must be considered, at block 312. Since there are no more instances of the lexical word "one" in the hypothesis lattice which begin at the starting time of 0, the answer at block 312 is no. At this point, the first queue 206 illustratively looks as shown in Table 2.

TABLE 2

| Path | End Time | Acoustic Score | Language Score | Estimated Score | Total Score |
|---|---|---|---|---|---|
| 1 | 1000 | 100 | 100 | 400 | 600 |
| 2 | 1200 | 80 | 100 | 360 | 540 |

The scores illustrated in Table 2 are computed as shown in greater detail in FIG. 8. For now, suffice it to say that the scores have an actual component and an estimated component. The actual component is the known score, which has been computed for each word in the hypothesis constructed to his point. The actual score is comprised of the actual acoustic score and the actual language model score. The estimated score is an approximation of the score which will be computed for this hypothesis subpath in the future, as the hypothesis subpath is filled out.

It should be noted, at this point, that path extender 202 illustratively treats queues 206 and 208 as sort-on-demand priority queues, which means that they are fixed in size, and that the contents are not sorted until the queue becomes full, or until a sort request has specifically been made. When the queue is full and an item must be added, then the item in the queue with the lowest score is dropped, assuming the new item under analysis has a higher score.

It should also be noted that at this point the hypotheses in queue 206 starting with hypothesis 1 look to be more promising than those starting with path 2. Therefore, if the priority queue could only hold a single entry, path 2 would be dropped from the queue at this point and would never be discovered as the beginning of the true best alternative path. It is for this reason that the priority queue size is illustratively kept reasonably high. It is believed based on empirical results that a factor of 100 is more than adequate. For example, a queue which maintains 1000 entries to determine the ten best alternatives has more than ample room to substantially ensure that the ten best alternatives will actually be computed and maintained for presentation to the user.

Once all of the hypotheses associated with the beginning word have been identified and placed in queue 206, other words from hypothesis lattice 116 are concatenated to those beginning words in order to continue constructing the alternate hypothesis subpaths for presentation to the user.

Therefore, as illustrated in FIG. 7B, path extender 202 selects an entry in the first queue 206. This is indicated by block 314 in FIG. 7B. Path extender 202 then examines hypothesis lattice 116 and chooses a next word from the hypothesis lattice that has a starting time which is coincident with the ending time of the preceding word in the entry selected from the queue 206 and does not violate the ending conditions. This is indicated by block 316.

For example, at block 314, path extender 202 selects the first entry (i.e., the first hypothesis alternative subpath) from the first queue 206, illustrated in Table 2. Since that hypothesis has an ending time at 1000, the next word in the hypothesis lattice, which is chosen by path extender 202, must have a beginning time of 1000. In addition, that next word must not violate the ending boundary conditions. It can be seen that hypotheses 4, 5, 6 and 7 will all extend hypothesis 1, since all have a starting time of 1000 and an ending time which does not violate the ending boundary conditions. However, hypotheses 6 and 7 correspond to the lexical word which has been identified by the user as being wrong. Therefore, they are not considered.

Thus, path extender 202 first chooses hypothesis 4 and concatenates that word to the previous word to extend the selected hypothesis alternate subpath and thus create a new alternate hypothesis. This is indicated by block 318 in FIG. 7B.

A score for this new hypothesis is also computed and it is determined whether the score is high enough to be placed in the second queue 208. Computation of the score is indicated by block 320 and determining whether that score is sufficient to be placed in the second queue 208 is indicated by blocks 322–332. For example, if the second queue 208 is not full, as indicated by block 322, then the new hypothesis alternate subpath is simply added to the second queue as indicated by block 324. However, if at block 322, the second queue is full, then that queue is sorted by score as indicated by block 236. If the score of the new hypothesis alternate subpath is greater than the lowest score in the second queue 208, then the hypothesis with the lowest score in the second queue 208 is deleted as indicated by blocks 328 and 330. The new extended subpath is then simply added to queue 208 as indicated by block 324. However, if, at block 328, the score of the new hypothesis subpath is not greater than the lowest score in queue 208, then the new subpath is discarded as indicated by block 332.

It is then determined whether the selected hypothesis subpath from the first queue 206 can be extended using a different next word. This is indicated by block 334. It can be seen that the first hypothesis can be extended by both hypotheses 4 and 5 in the hypothesis lattice. Therefore, both of those words are concatenated to the word in hypothesis 1 in order to construct hypothesis alternate subpaths.

Those are the only two second words that can be concatenated to the first word corresponding to hypothesis 1 in the hypothesis lattice of table 1. Therefore, processing moves from block 334 to 336 where it is determined whether more entries (i.e., hypothesis alternative subpaths) in the first queue need to be extended. In this case, of course, hypothesis 2 in Table 2 must also be extended. Hypothesis 7 from the hypothesis lattice shown in Table 1 can be used to extend hypothesis 2 since hypothesis 2 has an ending time of 1200 and since hypothesis 7 has a beginning time of 1200. Therefore, this extended path is pushed on to the second queue 208 along with its score. At this point, the second queue 208 looks as follows:

TABLE 3

| Path | End Time | Acoustic Score | Language Score | Estimated Score | Total Score |
|---|---|---|---|---|---|
| 1-4 | 2000 | 100 + 100 | 100 + 120 | 200 | 620 |
| 1-5 | 2000 | 100 + 50 | 100 + 80 | 200 | 530 |
| 2-8 | 2000 | 80 + 140 | 100 + 120 | 200 | 640 |

Since all the paths in queue 206 have been extended, processing moves to block 338 where it is determined whether all of the hypothesis alternative subpaths have been fully constructed as far as they can be up to this point. In other words, it is determined whether the entries in queue 208 (i.e., the hypothesis alternative subpaths) have been constructed such that they satisfy the ending boundary conditions. If not, this means that additional extensions are possible before the subpaths are fully constructed. Path extender 202 switches the identities of priority queues 206 and 208. This is indicated by block 340. Processing then reverts to blocks 314-336.

Therefore, path extender 202 selects an entry from the first queue (now queue 208). Path extender 202 chooses a next word from the hypothesis lattice that has a starting time coincident with the ending time of the preceding word in the hypothesis alternative subpath of the selected entry and does not violate the ending conditions. Therefore, path extender 202 chooses the hypothesis 1-4 from queue 208 (represented by Table 3) and looks for additional words in the hypothesis lattice which have a beginning time of 2000 and which do not violate the ending condition. The only word in the hypothesis lattice of the present example which meets these conditions is hypothesis 9 which corresponds to the lexical word "three" that has a beginning time of 2000 and an ending time of 3000. That hypothesis is thus concatenated to the hypothesis 1-4 from queue 208, a score is computed for the total hypothesis 1-4-9, and it is placed in queue 206 (in accordance with block 324 of FIG. 7B, since the second queue, now queue 206 was not full).

Because this is the only hypothesis from the hypothesis lattice that can be used to extend the hypothesis 1-4 from Table 3, and since there are more entries (i.e., hypothesis alternate subpaths) in queue 208 to be considered, processing reverts back to block 314. Therefore, path extender 202 selects the next entry in the first queue (now queue 208) as path 1-5, and determines whether that path can be extended using other words in the hypothesis lattice. Again, the only word from the hypothesis lattice that can be used to extend hypothesis 1-5 is hypothesis 9 since it corresponds to the lexical word "three" and since it has a beginning time of 2000 and an ending time of 3000. Therefore, the word is concatenated to the hypothesis 1-5 to form the hypothesis 1-5-9, a score is computed for that path, and the hypothesis and its score are placed in queue 206.

Path extender 202 then selects the next hypothesis 2-8 from queue 208 (as indicated in Table 3). The only word from the hypothesis lattice that can be used to extend hypothesis path 2-8 is, again, hypothesis 9, which corresponds to the lexical word "three" and has a beginning time of 2000 and an ending time of 3000. This hypothesis has a score computed for it and is placed in priority queue 206.

At this point, all of the hypothesis alternative subpaths from queue 208 (and illustrated in Table 3) have been considered and extended to their full extent. They can be extended no more, and still satisfy the ending boundary conditions. Therefore processing moves from block 338 in FIG. 7B to block 342. Queue 206 now looks as follows:

TABLE 4

| Path | End Time | Acoustic Score | Language Score | Estimated Score | Total Score |
|---|---|---|---|---|---|
| 1-4-9 | 3000 | 100 + 100 + 100 | 100 + 120 + 60 | 0 | 580 |
| 1-5-9 | 3000 | 100 + 50 + 100 | 100 + 80 + 60 | 0 | 490 |
| 2-8-9 | 3000 | 80 + 140 + 100 | 100 + 120 + 60 | 0 | 600 |

In block 342, all paths which satisfy the beginning and ending boundary conditions have been considered, and those associated with the top scores have been retained in priority queues 206 and 208.

In accordance with one illustrative embodiment of the present invention, output component 212 determines whether the number of alternative subpaths in the output queue meet a predetermined minimum number of alternates. For example, if the present invention is required to provide 10 alternative subpaths each time a user selects text in the reference path to be corrected, output component 212 examines the output queue to determine whether 10 alternatives are contained in the output queue. If not, output component 212 provides a signal indicative thereof to boundary locator 200 and path extender 202. Boundary locator 200 then expands the boundary conditions such that more alternatives can be computed.

For example, assume that the entire sentence which the user has uttered is "She examined references one to three in the bibliography." In this example, the word "to" was incorrectly recognized as "two". The user has thus only highlighted the word "two" for correction. Therefore, in accordance with a first illustrative embodiment of the present invention, the boundary conditions are set based only on a single preceding word and a single subsequent word. However, since those boundary conditions only yielded a number of alternatives less than ten, boundary locator 200 expands the boundary conditions. In one illustrative embodiment, boundary locator 200 expands either the beginning or the ending boundary condition to coincide with an additional word on either side of the text selected by the user (i.e., the beginning boundary will be moved to the word "references" instead of "one" or the ending boundary will be moved to the word "in" instead of "three"). In accordance with another embodiment, boundary locator 200 expands both the beginning and ending boundary conditions to include an additional word. Expanding the boundary conditions is indicated by block 344 in FIG. 7B. Once the boundary conditions have been expanded, processing reverts back to block 290 in FIG. 7A where the hypothesis alternative subpaths are again constructed as described above.

Once a sufficient number of hypothesis alternative subpaths have been constructed, as determined at block 342, the last queue which is used to contain the hypothesis alternate subpaths is sorted according to score. This is indicated by block 346. Thus, that queue will now contain a sufficient number of alternatives, arranged in order of score, for presentation to the user.

As one additional and optional step, output component 212 can provide the N-Best alternatives to an optional inverse text normalization component which performs inverse text normalization (ITN) on the N-Best alternatives. This process can be done in any known way, and converts phrases such as "three fifteen p.m." to "3:15 p.m.". In the above example, at the discretion of the ITN processor, the phrase "one to three" may be converted to "1-3". This is indicated by block 348 in FIG. 7B. Finally, the top N alternative subpaths are presented to the user. This is indicated by block 350.

FIG. 8 is a flow diagram illustrating one illustrative embodiment of how scores are calculated for the hypothesis alternative subpaths constructed and for priorities in queues 206 and 208. In one illustrative embodiment, the scores are calculated according to the known A* algorithm. A known score is calculated for each subpath under construction. A function is defined to estimate the score of the unknown portion of the subpath being constructed. The sum of the known score and the estimated score is the total score assigned to the path. In accordance with one illustrative embodiment of the present invention, a simple linear approximation is used:

f(t) is the total score; and g(t) is the known score at time t, and h(t) is the estimated score at time t.

In other words:

$f(t)=g(t)+h(t)$, where g(t)=the sum of acoustic and language model scores up to time t, and h(t)=a linear fraction of the optimal score for the remaining time.

The known score g(t) is simply the sum of the acoustic and language model scores. In terms of determining the rank of paths, the score is illustratively computed as the sum of the acoustic scores, plus language model scores. The acoustic score is simply the score assigned by the suitable acoustic model. The language model score can be the unigram probability which is the probability of a word being present in speech. It could also be an n-gram probability which is the probability of a word, given a particular set of n−1 words preceding it. It could also be a combination of such scores. For the same sequence of words, the language model score will be the same. For purposes of this example, we are assuming that the total score for the best path, or reference path is 600.

The actual score for an alternate subpath under construction is calculated by summing those two scores (acoustic and language model scores) as illustrated by block 352 in FIG. 8. The estimated score is calculated by taking a portion of the alternative subpath remaining to be calculated times the total score for the reference subpath. This is indicated by block 354. These two scores are added (the actual and estimated scores) to obtain the final score as indicated by block 356.

Reverting again to the above example, the estimated score is calculated as follows:

h(1000)=optimal score×(total time in subpath given beginning and ending times−elapsed time)/total time $$= 600 \times (3000 - 1000)/3000 = 400$$

In this way, all actual and estimated scores are calculated. Of course, other suitable techniques for estimating the score for the remaining path can be used as well.

FIG. 3B better illustrates the optional data structures associated with CARC array 210, which is used in tracking entries in priority queues 206 and 208. CARC array 210 is simply an array of CARC objects or data structures, illustrated by FIG. 3B. Each CARC object includes an index of this object identifying its location in CARC array 210. The CARC object also includes a word hypothesis index which is an index into the hypothesis lattice that holds the information such as the lexical word, its beginning time, its ending time and its acoustic score. The CARC object also holds a path length indicator which indicates the length of the path in which this CARC object resides. Further, the CARC object includes an index of a previous CARC object. This is basically a back pointer within CARC array 210 to a CARC object which forms a previous object in the hypothesis corresponding to the path in which this CARC object resides. The CARC object also includes, in this embodiment, two dictionary word indices of the preceding word and the word which precedes the preceding word. This provides information such that score computation component 204 can access language model 110 and compute a language model score for the particular word represented by the CARC object. These indices are thus used to compute the joint probability of the word sequence, which is typically referred to as the n-gram probability, and the number of indices to preceding words will be dictated by the particular type of language model used (i.e., by the number "n"). It should also be noted that these will not necessarily be the same as the word indices of the preceding CARC objects, since those entries may be linguistically insignificant (such as silence).

In the embodiment in which CARC array 210 is used. Priority queues 206 and 208 identify the hypothesis path by simply containing a pointer into the CARC array and a score associated with that path. By accessing the position pointed to in the CARC array 210, and following the back pointer path through CARC array 210, all words which have been concatenated to construct that hypothesis entered in the queue can be located. In addition, the acoustic score for each word can be obtained by indexing into the word hypothesis lattice, and the language model score for each word can be computed based upon the dictionary word indices contained in the CARC objects associated with each word.

Therefore, when a new word is to be concatenated to a hypothesis to form a new hypothesis, the new score for that hypothesis can be calculated by simply tracing back through the CARC array 210 and obtaining the scores for all of the elements in the hypothesis.

It should also be noted that the priority queues can be thought of as two linked lists, one containing active items and the other containing inactive items. Unlike a typical implementation where each node is allocated on a heap individually, the object in accordance with the present invention instead has an array of elements with pointers to within the array. This obviates the frequent allocations and de-allocations required in usual queue implementations. Since the queue size is predetermined, the heap activity and fragmentation is reduced over conventional techniques.

Another feature of the present invention should be mentioned as well. When the user selects one of the alternates from the N-best alternatives presented to the user, the application can optionally indicate to SR engine 103 the alternative which was selected by the user. Based on the selected alternative, the engine 103 is illustratively configured to modify language model 110, acoustic model 112 and/or its other model subsystems so the same misrecognition is less likely to occur in the future. Similarly, even if the user chooses to re-utter the utterance, SR engine 103 can still learn from the misrecognition. For example, if the user chooses to re-utter the utterance, application 120 will first invoke generator 124 to obtain the N-best alternatives for the original utterance. SR engine 103 then receives the re-utterance and provides the reference path to application 120 for the re-utterance. The application 120 then illustratively determines whether the reference path for the re-utterance corresponds to one of the alternatives for the original utterance. If so, application 120 provides this information to SR engine 103 which, again, modifies its model subsystems.

It should also be noted that the present invention can be utilized by storing received audio information and invoking decoder 106 at a later time. The N-best alternatives can be computed at that time. However, this tends to consume more memory than simply storing the hypothesis lattice.

It can thus be seen that the present invention provides significant advantages over prior art systems. For example, with the present invention, the N-Best alternatives need not even be computed until the user selects text to be corrected. In that case, the present system simply accesses the word hypothesis lattice, and begins constructing alternative subpaths using the priority queues and CARC array illustrated in FIG. 3A. The hypothesis lattice is accessed using boundary conditions as a filter to increase efficiency. Also only a predetermined number of paths are ever considered at the same time (i.e., the predetermined number being set by the size of the priority queues). This renders the computation of the N-Best alternatives even more efficient and can be done substantially on-the-fly.

Similarly, applications can persist the hypothesis lattice such that alternates can be requested at an arbitrary point in the future. This allows a user who dictate a document and have the document proofread by another person, on another machine, or simply at a later time.

Although the present invention has been described with reference to preferred embodiments, workers skilled in the art will recognize that changes may be made in form and detail without departing from the spirit and scope of the invention.

What is claimed is:

1. A computer readable medium storing instructions which, when executed by a computer, cause the computer to perform a method of generating alternatives to words indicative of recognized speech, recognized based on input speech data, comprising:

generating a reference path of recognized words based on the input speech data;

receiving an operator selection input indicative of a selected portion of the recognized speech for which alternatives are to be generated;

calculating boundary conditions for alternatives based on position bounds of a reference subpath corresponding to the selected portion of the recognized speech; and constructing from a hypothesis store, corresponding to the input speech data, alternate subpaths satisfying the boundary conditions.

2. The computer readable medium of claim 1 wherein calculating the boundary conditions comprises:

determining the position bounds of the reference subpath by identifying, as a beginning boundary condition, a beginning time in the reference path of a first boundary word, the first boundary word preceding the selected portion of the recognized speech.

3. The computer readable medium of claim 2 wherein calculating the boundary conditions comprises:

determining the temporal bounds of the reference subpath by identifying, as an ending boundary condition, an ending time in the reference path of a second boundary word, the second boundary word following the selected portion of the recognized speech.

4. The computer readable medium of claim 3 wherein the hypothesis store includes a word hypothesis lattice indicative of entries for a plurality of alternate words corresponding to utterances in the input speech data, each entry including a lexical word, a beginning time in the input speech data corresponding to the lexical word and an ending time in the speech data corresponding to the lexical word, and wherein constructing alternate subpaths comprises:

obtaining from the hypothesis lattice instances of the first boundary word that satisfy the beginning boundary condition.

5. The computer readable medium of claim 4 wherein constructing alternate subpaths comprises:

concatenating to each of the instances of the first boundary word a string of one or more additional words, wherein the string of one or more additional words satisfies the ending boundary condition.

6. The computer readable medium of claim 5 wherein constructing alternate subpaths comprises:

concatenating to each of the instances of the first boundary word a string of one or more additional words, wherein the string of one or more additional words ends in an instance of the second boundary word that satisfies the ending boundary condition.

7. The computer readable medium of claim 5 wherein concatenating comprises:

for each instance of the first boundary word, obtaining from the hypothesis lattice one or more instances of a first intermediate word having a beginning time corresponding to an ending time of the first boundary word and having an ending time.

8. The computer readable medium of claim 7 wherein concatenating further comprises:

continuously concatenating additional words until an alternate path is formed satisfying the boundary conditions, each of the additional words having a beginning time corresponding to an ending time of a preceding word and an ending time corresponding to a beginning time of a subsequent word.

9. The computer readable medium of claim 1 wherein constructing alternate subpaths comprises:

beginning construction of up to a predetermined number, X, of hypothesis alternate subpaths; and assigning each hypothesis alternate subpath a score that is updated as the hypothesis alternate subpath is constructed.

10. The computer readable medium of claim 9 wherein assigning a score comprises:

computing an actual score for the alternate subpath through a temporal point to which the hypothesis alternate subpath is constructed; and computing an estimated score, estimating a score associated with a remainder of the hypothesis alternate subpath to be computed.

11. The computer readable medium of claim 10 wherein computing an actual score comprises:

computing the actual score as a combination of acoustic scores for words in the hypothesis alternate subpath and language model scores for the words in the hypothesis alternate subpath.

12. The computer readable medium of claim 11 wherein computing an estimated score comprises:

computing the estimated score as a portion of a reference score assigned to the reference path, the portion of the reference score corresponding to an amount of the hypothesis alternate subpath left to be computed in relation to an overall length of the hypothesis alternate subpath.

13. The computer readable medium of claim 9 wherein constructing alternate subpaths comprises:

after beginning construction of each of the X hypothesis alternate subpaths, beginning construction of a hypothesis alternate subpath only if its score is one of the top X scores; and discontinuing construction of all hypothesis alternate subpaths having a score not in the top X scores.

14. The computer readable medium of claim 13 wherein constructing alternate subpaths comprises:

when construction of X hypothesis alternate subpaths has begun, sorting the hypothesis alternate subpaths by score.

15. The computer readable medium of claim 14 wherein constructing alternate subpaths comprises:

retaining hypothesis alternate subpaths having the top X scores as the alternate subpaths.

16. The computer readable medium of claim 15 wherein the method further comprises:

presenting the alternate subpaths to the user.

17. The computer readable medium of claim 1 wherein constructing alternate subpaths comprises:

constructing alternate subpaths that are lexically different from the reference subpath.

18. The computer readable medium of claim 17 wherein, when fewer than a predetermined number of lexically different alternate subpaths can be constructed, extending the boundary conditions and constructing alternate subpaths satisfying the extended boundary conditions.

19. The computer readable medium of claim 1 wherein constructing the alternate subpaths begins in response to the operator selection input.

20. A computer readable medium storing instructions which, when executed by a computer, cause the computer to perform a method of generating alternate speech recognitions for speech data input by an application, comprising:
   receiving the speech data at a speech recognition engine;
   generating a reference speech path and a hypothesis lattice based on the speech data, the hypothesis lattice representing alternate recognition paths corresponding to the speech data, the hypothesis lattice including a plurality of entries, each entry including an instance of a lexical word, a starting point in the speech data of the instance of the lexical word, an ending point in the speech data of the instance of the lexical word, and a score associated with the instance of the lexical word;
   storing the hypothesis lattice with the application;
   receiving a user selection input indicative of a portion of the reference speech path to be corrected;
   in response to the user selection input, accessing the retrieved hypothesis lattice with the speech recognition engine; and
   constructing, at the engine, alternate subpaths to replace portions of the reference speech path based on the hypothesis lattice.

21. The computer readable medium of claim 20 wherein the method further comprises:
   presenting the alternate subpaths to the user.

22. The computer readable medium of claim 20 wherein constructing alternate subpaths comprises:
   calculating boundary conditions for alternatives based on temporal bounds of a reference subpath corresponding to the selected portion of the reference speech path; and
   constructing from the hypothesis lattice alternate subpaths satisfying the boundary conditions.

23. The computer readable medium of claim 22 wherein calculating the boundary conditions comprises:
   determining the temporal bounds of the reference subpath by identifying, as a beginning boundary condition, a beginning time in the reference speech path of a first boundary word, the first boundary word preceding the selected portion of the reference speech path.

24. The computer readable medium of claim 23 wherein calculating the boundary conditions comprises:
   determining the temporal bounds of the reference subpath by identifying, as an ending boundary condition, an ending time in the reference speech path of a second boundary word, the second boundary word following the selected portion of the reference speech path.

25. A computer readable medium storing instructions which, when executed by a computer, cause the computer to perform a method of generating correction alternative to misrecognized words in input speech data, comprising:
   generating a reference path of recognized words based on the input speech data;
   receiving an operator selection input indicative of a selected misrecongnized portion of the recognized speech for which alternatives are to be generated;
   calculating boundary conditions for alternatives based on position bounds of a reference subpath corresponding to the selected misrecognized portion of the recognized speech; and
   constructing from a hypothesis store, corresponding to the input speech data, alternate subpaths satisfying the boundary conditions.

* * * * *